United States Patent
Hikita

(10) Patent No.: US 7,801,858 B2
(45) Date of Patent: Sep. 21, 2010

(54) FILE SYSTEM AND FILE INFORMATION PROCESSING METHOD

(75) Inventor: Jun Hikita, Kanagawa (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 11/592,392

(22) Filed: Nov. 3, 2006

(65) Prior Publication Data

US 2007/0112722 A1    May 17, 2007

(30) Foreign Application Priority Data

Nov. 7, 2005    (JP) .......................... P2005-322601

(51) Int. Cl.
*G06F 7/00* (2006.01)
*G06F 17/00* (2006.01)

(52) U.S. Cl. .................. 707/634; 707/638; 707/721

(58) Field of Classification Search .............. 386/95, 386/112; 707/100, 3, 203, 200, 1, 102, 101, 707/201, 104.1, 634, 721, 638; 717/122, 717/101
See application file for complete search history.

(56) References Cited

U.S. PATENT DOCUMENTS

| | | | | |
|---|---|---|---|---|
| 5,497,484 | A * | 3/1996 | Potter et al. ......................... | 1/1 |
| 5,706,510 | A * | 1/1998 | Burgoon ............................. | 1/1 |
| 6,223,343 | B1 * | 4/2001 | Hopwood et al. ........... | 717/101 |
| 7,058,667 | B2 * | 6/2006 | Goldick ............................... | 1/1 |
| 7,222,131 | B1 * | 5/2007 | Grewal et al. ....................... | 1/1 |
| 2002/0107859 | A1 * | 8/2002 | Tsuyuki ...................... | 707/100 |
| 2003/0163449 | A1 * | 8/2003 | Iwano et al. .................... | 707/1 |
| 2004/0199516 | A1 * | 10/2004 | Thames et al. ............... | 707/100 |
| 2005/0010562 | A1 * | 1/2005 | Nagasaka ....................... | 707/3 |
| 2005/0193031 | A1 * | 9/2005 | Midgley et al. ............. | 707/200 |
| 2006/0010150 | A1 * | 1/2006 | Shaath et al. ................ | 707/102 |
| 2006/0101092 | A1 * | 5/2006 | Ishida et al. ................. | 707/203 |
| 2007/0050428 | A1 * | 3/2007 | Anantharaman et al. .... | 707/203 |
| 2007/0206920 | A1 * | 9/2007 | Hirose et al. .................. | 386/95 |

FOREIGN PATENT DOCUMENTS

| | | |
|---|---|---|
| JP | 5 233448 | 9/1993 |
| JP | 2003-165837 | * 6/2003 |

OTHER PUBLICATIONS

Tetsuo Yamamoto et al., "Software Maintenance Environment with Version Control File System" Jul. 9, 1999, vol. 99, No. 164, p. 65-72.
Daisuke Yokota et al., "Design of a file system with multi-generation management for files on OS/omicron" Sep. 16, 1994, vol. 94, No. 80, p. 25-32.

* cited by examiner

*Primary Examiner*—John E Breene
*Assistant Examiner*—Giovanna Colan
(74) *Attorney, Agent, or Firm*—Frommer Lawrence & Haug LLP; William S. Frommer; Thomas F. Presson

(57) ABSTRACT

A file system that is organized in an operating system to manage a file to be recorded in a recording device in compliance with a file access request from an application. The file system includes a first recording section recording in a recording device a file that includes a management information section and a data section. A second recording section, which, when the first recording section records the file that includes the management information section and the data section, adds, as needed, an extended management information section that records information other than the management information section about the data section.

1 Claim, 7 Drawing Sheets

FILE SYSTEM AND FILE INFORMATION PROCESSING METHOD

CROSS REFERENCES TO RELATED APPLICATIONS

The present invention contains subject matter related to Japanese Patent Application JP 2005-322601 filed in the Japanese Patent Office on Nov. 7, 2005, the entire contents of which being incorporated herein by reference.

BACKGROUND OF THE INVENTION

1. Field of the Invention

The present invention relates to a file system and file information processing method that are used to manage, in compliance, for instance, with a file access request from an application, the file to be recorded in a recording device.

2. Description of the Related Art

A cache-incorporated magnetic disk file system proposed by Japanese Patent Laid-open No. Hei 5-233448 provided a magnetic disk file with a temporary memory in order to make a magnetic disk storage device compact and enhance the rewrite performance. When data was to be recorded, this file system recorded the data in both a cache memory and the temporary memory. When the magnetic disk file was to be rewritten, the file system used the data in the cache memory. The file system used the data in the temporary memory only in the event of a power failure or other emergency.

SUMMARY OF THE INVENTION

However, when a file was updated by using a file system disclosed in the past, a data section as well as the information such as the update time were overwritten with new data. Therefore, when a data update history was to be managed, it was possible to create and manage an application or the like; however, no existing file systems could exercise history management at the file system level.

In a situation where a data update history was managed by an application, it could be readily falsified from the outside.

The present invention has been made in view of the above circumstances, and provides a file system and file information processing method that make it possible to exercise history management at the file system level without being subject to external falsification.

According to an embodiment of the present invention, there is provided a film system including: a first recording section, which records in a recording device a file that includes a management information section and a data section; and a second recording section, which, when the first recording section records the file that includes the management information section and the data section, adds, as needed, an extended management information section that records information other than the management information section about the data section.

Consequently, the first recording section records in a recording device a file that includes a management information section and a data section. When the first recording section records the file that includes the management information section and the data section, the second recording section adds, as needed, an extended management information section that records information other than the management information section about the data section.

According to an embodiment of the present invention, there is provided a file information processing method including: a first step that is followed, when a predetermined period of time elapses after a new file is created, to create copy data of data in the file together with management information about the file, and record management information about the copy data in an extended attribute section of the file as history information; a second step that is followed, when the file is to be overwritten, to update the data in the new file and the history information about an extended attribute of the new file while leaving the history information about the current extended attribute of the file; a third step of creating copy data of the data in the new file together with the management information about the new file, and recording the history information about the copy data as an extended attribute of the new file; a fourth step of referencing the updated history information through extended information about the file and the extended attribute of the new file; and a fifth step that makes it possible to restore or copy past file data from the updated history information, and, when the data is restored, handles the restored data as the latest file data.

Consequently, when a predetermined period of time elapses after a new file is created, the first step is followed to create copy data of data in the file together with management information about the file, and record management information about the copy data in an extended attribute section of the file as history information. When the file is to be overwritten, the second step is followed to update the data in the new file and the history information about an extended attribute of the new file while leaving the history information about the current extended attribute of the file. The third step is followed to create copy data of the data in the new file together with the management information about the new file, and record the history information about the copy data as an extended attribute of the new file. The fourth step is followed to reference the updated history information through extended information about the file and the extended attribute of the new file. The fifth step makes it possible to restore or copy past file data from the updated history information. When the data is restored, the restored data becomes the latest file data.

Consequently, an embodiment of the present invention does not overwrite information upon each file update unlike a file system disclosed in the past. Further, an embodiment of the present invention manages the file update history and data history at the file system level and does not allow an application to manage the file update history. Therefore, only the file system can recognize the file update history and data history. As a result, the data will not be falsified. In addition, the user can reference the data as needed via the file system.

Since the present invention can manage the file update history and data history at the file system level, history management can be exercised at the file system level that does not permit external falsification.

DETAILED DESCRIPTION OF THE PREFERRED EMBODIMENT

An embodiment of the present invention will now be described with reference to the accompanying drawings.

Figure 1:
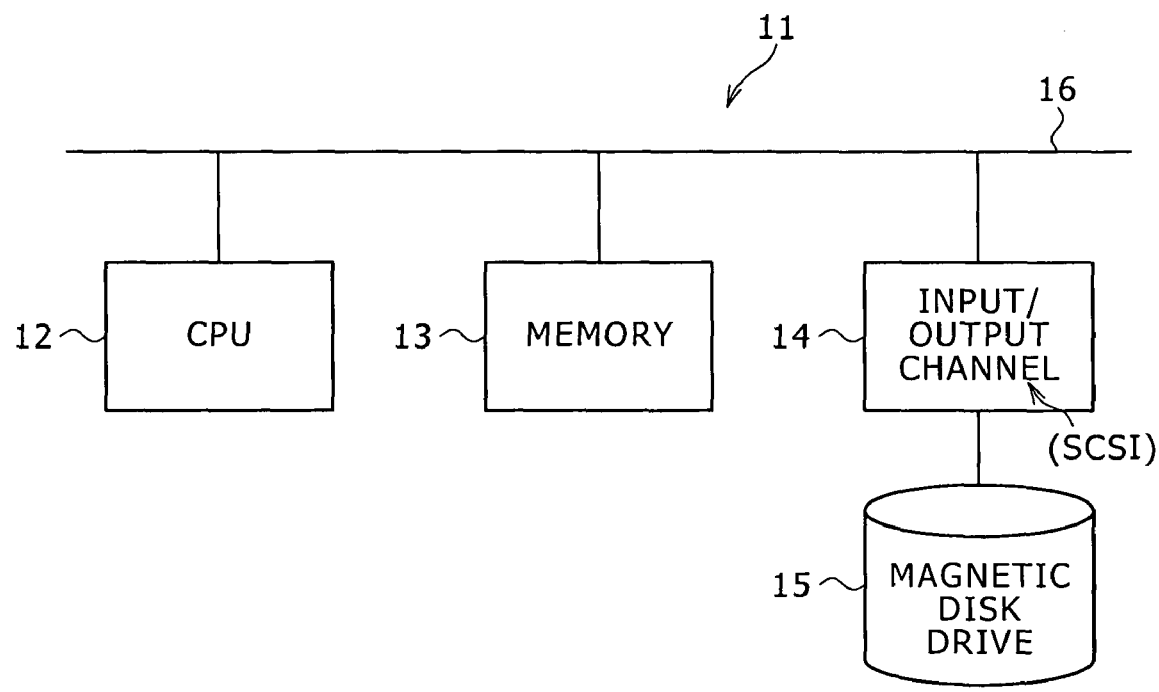
FIG. 1 shows a typical configuration of a storage device.

FIG. 1 shows a typical configuration of a storage device.

As shown in FIG. 1, the storage device 11 includes a CPU (Central Processing Unit) 12, which provides control; a memory 13, which stores control data and control program; an input/output channel 14, which processes a data write request from a host computer (not shown) or a data read request from the host computer via a SCSI (Small Computer System Interface) or other interface; a magnetic disk drive 15, which stores data in the form of a file; and an internal bus 16, which interconnects the CPU 12, memory 13, and input/output channel 14.

The storage device 11, which is configured as described above, operates as described below.

The CPU 12 reads the control program stored in the memory 13 and starts the read control program. The started control program causes the CPU 12 to read the control data stored in the memory 13 and waits for a request from the host computer.

When the host computer (not shown) issues a data write request, the CPU 12 supplies a data write process command and write data to the input/output channel 14. When the data write process command and write data are supplied from the CPU 12, the input/output channel 14 performs a data write process for the write data in relation to the magnetic disk drive 15. This causes the magnetic disk drive 15 to store the write data in the form of a file. When the input/output channel 14 begins to perform the data write process for the write data in relation to the magnetic disk drive 15, the CPU 12 notifies the host computer that a data write is terminated. In this manner, a high-speed data write is achieved.

When, on the other hand, a request for reading data into the host computer is issued, the CPU 12 supplies a data read process command to the input/output channel 14. When the data read process command is supplied from the CPU 12, the input/output channel 14 performs a data read process for read data in relation to the magnetic disk drive 15.

The magnetic disk drive 15 then reads the read data, which is stored in the form of a file. The input/output channel 14 supplies the read data, which is read from the magnetic disk drive 15, to the CPU 12. The CPU 12 supplies the read data, which is supplied from the input/output channel 14, to the host computer. When the input/output channel 14 begins to perform the data read process for the read data in relation to the magnetic disk drive 15, the CPU 12 notifies the host computer that a data read is terminated. In this manner, a high-speed data read is achieved.

Although it is assumed that a disk in the magnetic disk drive 15 is used as a recording medium for the storage device 11, the use of an optical disk, magnetic tape, semiconductor memory, or the like is acceptable as far as it can store data in the form of a file.

Figure 2:
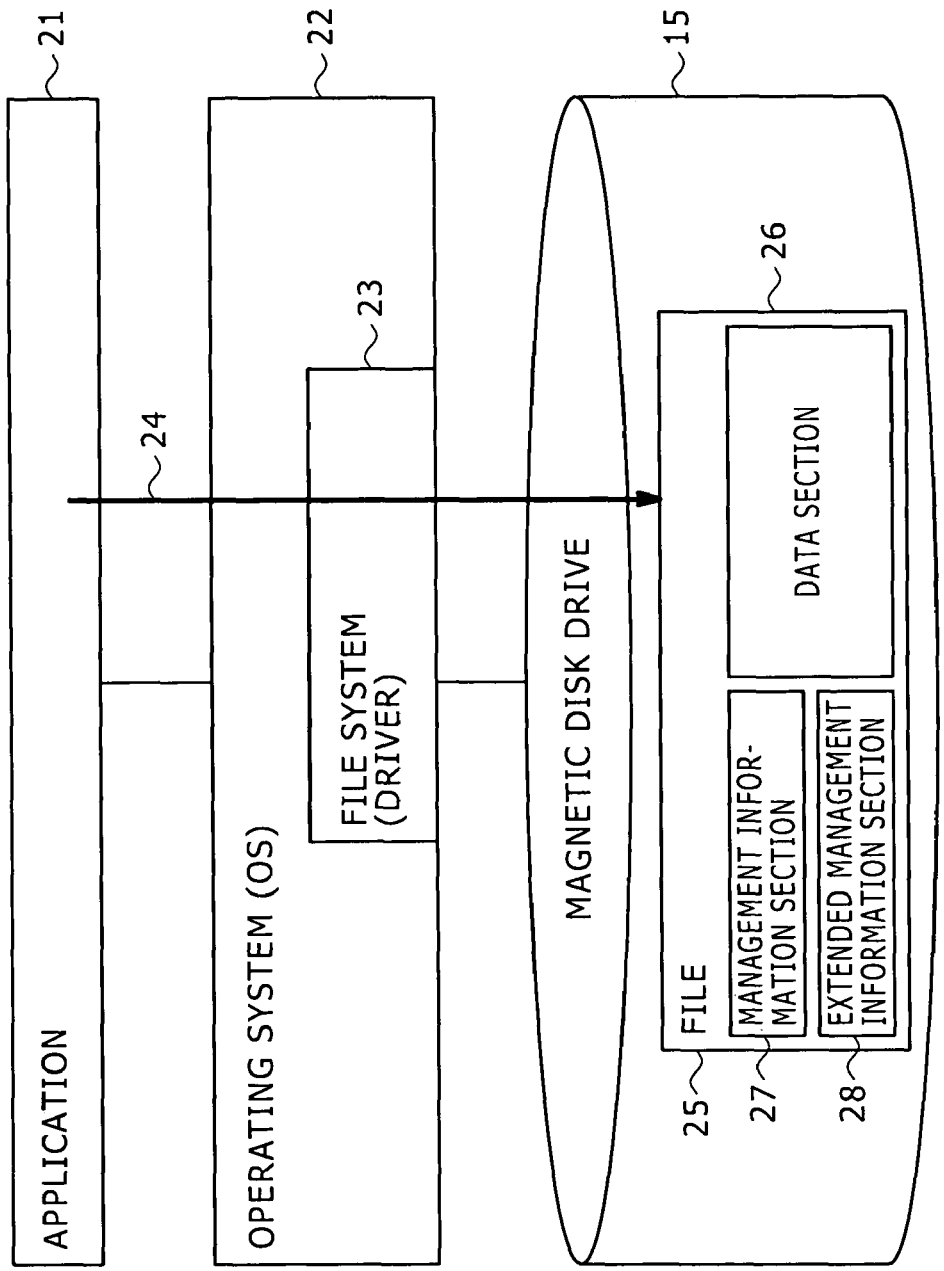
FIG. 2 is a block diagram illustrating a software configuration.

FIG. 2 is a block diagram illustrating a software configuration.

FIG. 2 shows a hierarchical structure of software that is implemented by the control program, which is started by the storage device 11 shown in FIG. 1.

In general, when a file 25 is to be written onto the lower-level magnetic disk drive 15 within a common computer storage device 11 that includes the elements shown in FIG. 1, a file system 23 within an operating system (OS), which is middleware, manages the file 25 to be recorded on the magnetic disk dive 15, as shown in FIG. 2.

When, for instance, a request for file access 24 for a data write is issued, the file system (the driver of the file system) 22, which is middleware, records the file 25, which includes a management information section 27 and a data section 26, onto the lower-level magnetic disk drive 15 in compliance with a file access request from an upper-level application 21.

When a request for file access 24 for a data read is issued, the file system (the driver of the file system) 22, which is middleware, reads data from the file 25, which includes the management information section 27 and data section 26 and is stored on the lower-level magnetic disk drive 15, in compliance with a file access request from the upper-level application 21.

In the above instance, an extended management information section 28 is added to the file 25 as needed. In general, management information elements recorded in the management information section 27 are a file owner, group, permission information, time information (ctime (management information update time), mtime (data section update time), and atime (access time)), file size, block size, data section pointer information, and so on. The data section 26 records a data portion of the file 25. The extended management information section 28 can record information that is not managed by the management information section 27 although some difference exists depending on the employed file system 23.

The operation performed by the software configured as shown in FIG. 2 will now be described.

Figure 3:
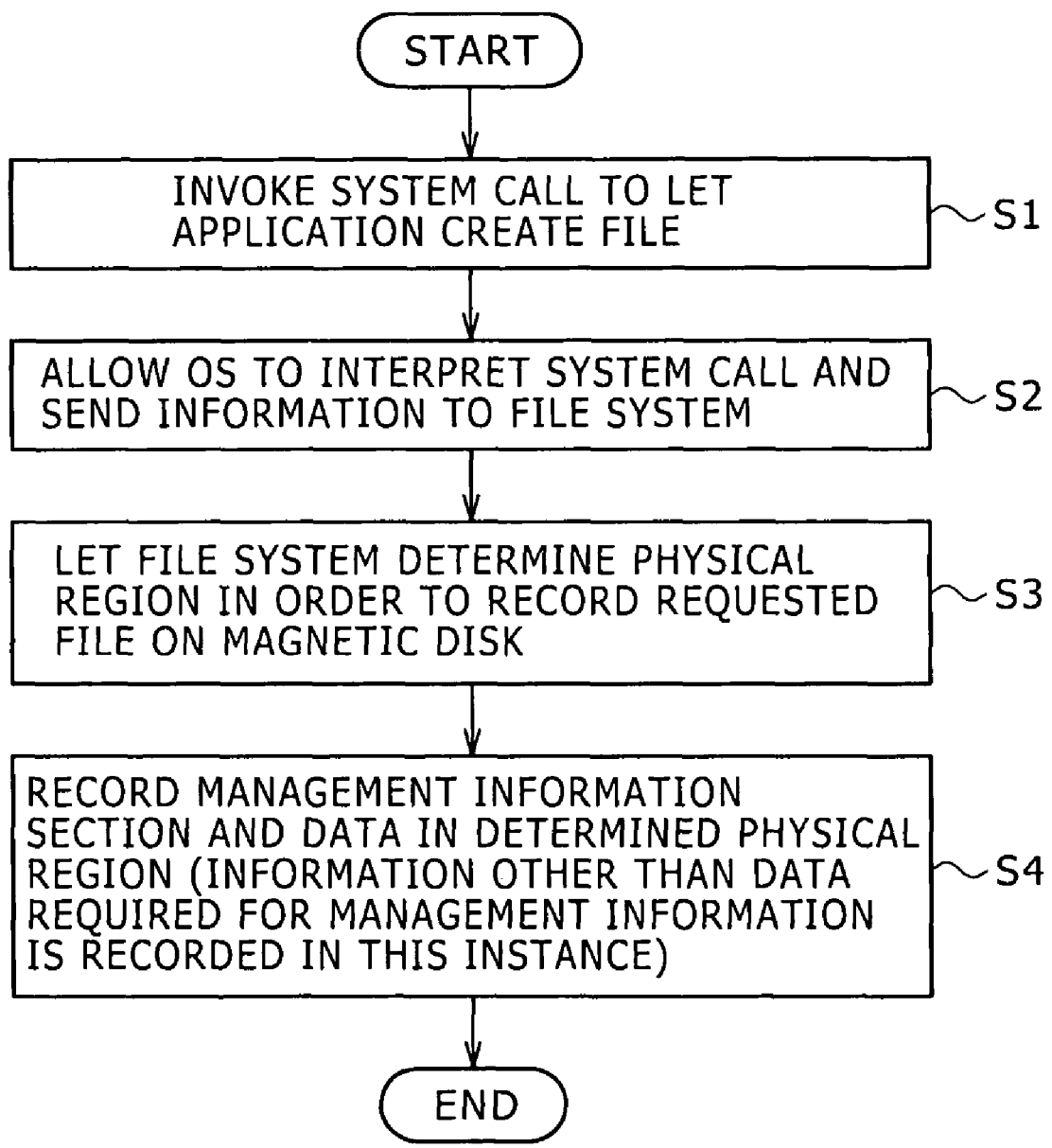
FIG. 3 is a flowchart illustrating a file creation process.

FIG. 3 is a flowchart illustrating a file creation process.

First of all, the application 21 invokes a system call for file creation (step S1), as indicated in FIG. 3. More specifically, the application 21 supplies a file creation system call to the operating system (OS) 22.

Next, the operating system (OS) 22 interprets the system call and sends information to the file system 23 (step S2). More specifically, the operating system (OS) 22 recognizes that the system call supplied from the application 21 is for file creation, and supplies process information for file creation to the file system 23.

The file system 23 then determines a physical region on the magnetic disk drive 15 for the purpose of recording a requested file 25 (step S3). More specifically, the file system 23 assigns a physical region that corresponds to the recording size of the requested file 25 and is identified by tracks and sectors of the magnetic disk drive 15.

The management information section 27 and data section 26 are then recorded in the determined physical region. In this instance, information other than the data required for the management information is recorded (step S4). More specifically, the file system (the driver of the file system) 22 records on the magnetic disk drive 15 the file 25 that includes the management information section 27 and data section 26. In this instance, the extended management information section 28 is added as needed to the file 25, and the extended management information section 28 records information other than the information managed by the management information section 27.

As described above, the file system 23 creates the file 25 in the magnetic disk drive 15 via the operating system (OS) 22 in compliance with the system call invoked by the application 21. As indicated by the processing flow shown in FIG. 3, the file system 23 creates and records the management information section 27 and data section 26 of the file 25, which is to be written onto the magnetic disk drive 15, in compliance with a request from the application 21.

In the above instance, the extended management information section 28 is added as needed to the file 25. If the same file 25 is accessed, the file 25 is updated by overwriting necessary information into the existing file 25.

A case where history information is stored in the extended management information section 28 for exercising an automatic history storage function for the data section 26 of the file 25 will now be described.

Figure 4:
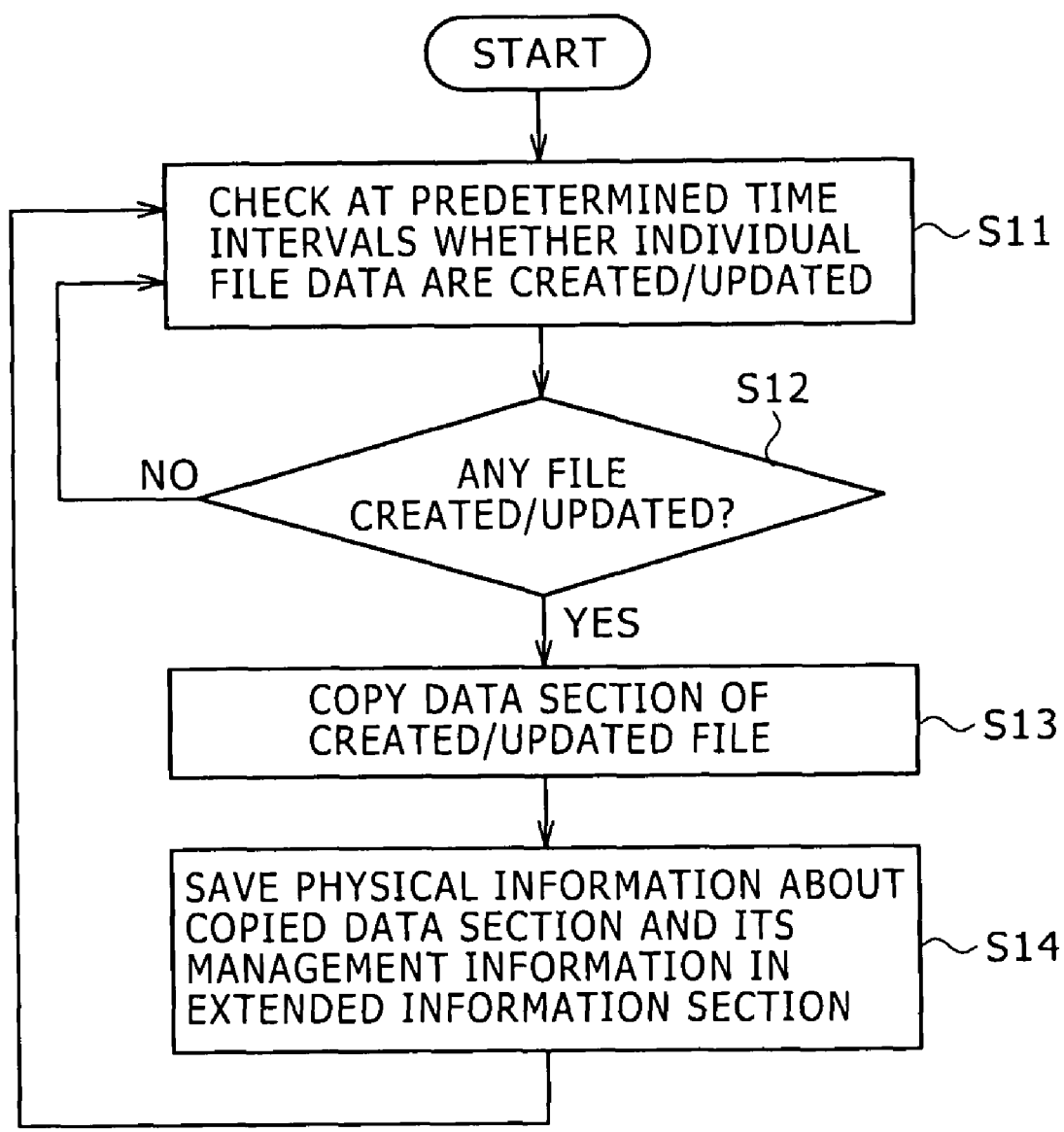
FIG. 4 is a flowchart illustrating an automatic history management process that is performed by a file system.

FIG. 4 is a flowchart illustrating an automatic history management process that is performed by the file system.

First of all, the file system 23 checks at predetermined time intervals whether individual file data are created/updated as indicated in FIG. 4 (step S11). More specifically, the file system 23 detects at predetermined cycle time intervals whether the data in the file 25 on the magnetic disk drive 15 is created or updated.

Next, the file system 23 checks for a file 25 whose data is created or updated (step S12). More specifically, the file system 23 checks for a file 25 whose management information section 27 is newly created or updated.

If the judgment result obtained in step S12 indicates that the data in a file 25 is created or updated, the file system 23 makes a copy of the data section 26 of the file 25 whose data is created or updated (step S13). More specifically, the file system 23 makes a copy of the data section 26, in which the data is created or updated, each time the data is created or updated, for the purpose of recording changes in the created or updated data in an identifiable manner.

The file system 23 then stores the physical information about the copied data section 26 and its management information in the extended management information section 28 (step S14). More specifically, the file system 23 stores the physical information and management information in the extended management information section 28 as the history information. The stored physical information includes the recording capacity of the copied data section 26 and the physical region that is identified by the tracks and sectors assigned to the magnetic disk drive 15. The stored management information includes the file owner prevailing at the time of copying, group, permission information, time information (ctime (management information update time), mtime (data section update time), and atime (access time)), file size, block size, and data section pointer information.

When step S14 is completed or when the judgment result obtained in step S12 indicates that no data is created or updated in any file 25, processing returns to step S11. Steps S11 to S14 are then repeated for processing or judgment.

As described with reference to the flowchart in FIG. 4, a check is performed at predetermined time intervals to judge whether individual file data are created or updated. If the data in any file is created or updated, the data section 26 is copied and the history information about the data section 26 is automatically stored in the extended management information section 28.

The data section history storage method described above stores a copy of the data section on the magnetic disk drive 15 or on a recording medium such as a memory, magnetic tape, or optical disk and stores the physical position information about the copied data section and the history information about its management information in the extended management information section 28 of the file each time the data is created or updated.

Figure 5:
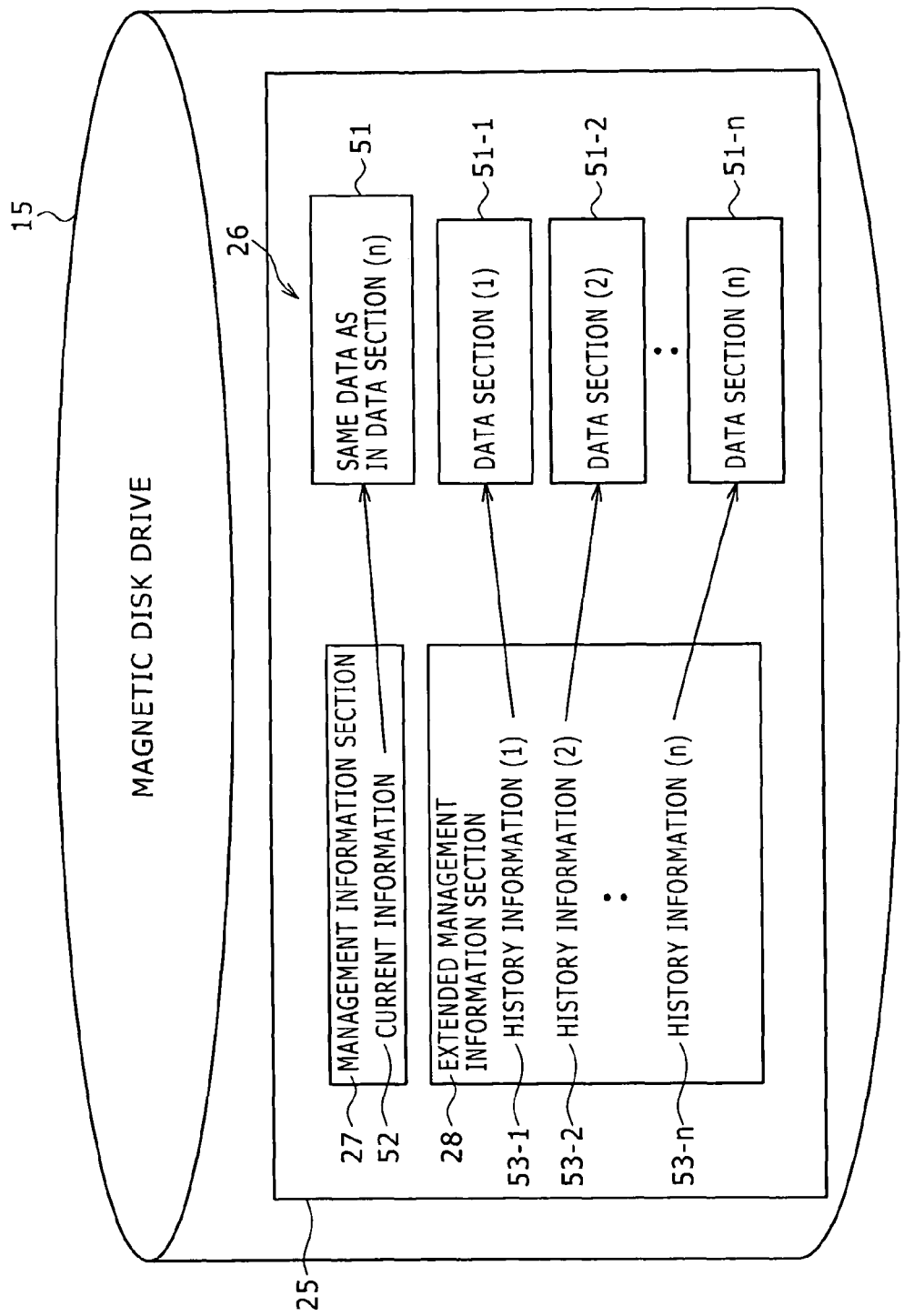
FIG. 5 is a diagram illustrating the history management of a file.

FIG. 5 is a diagram illustrating the history management of a file.

As indicated in FIG. 5, data section (1) 51-1, data section (2) 51-2, . . . and data section (n) 51-$n$, which are copies of the data section 26, are created upon each data creation or update. Further, history information (1) 53-1 about data section (1) 51-1, history information (2) 53-2 about data section (2) 51-2, . . . history information (n) 53-$n$ about data section (n) 51-$n$ are automatically stored in the extended management information section 28.

Data 51, which is the same as data section (n) 51-$n$, is now recorded in the data section 26 as the current data. The current management information 52 about data 51, which is the same as data section (n) 51-$n$, is recorded in the management information section 27.

When the history information updated in the manner described above is repeatedly stored to update the file 25 n times, the resulting storage state is as indicated in FIG. 5. Therefore, the history information about the updated data and the history about the data itself can be both stored. The entire history can also be stored when a regular update check is performed immediately after a file is created/updated.

Meanwhile, when an administrator adjusts the settings to limit the number of updates n and automatically erase the history of n+1 updates, it is possible to establish a scheme for storing the history of limited updates (n updates). It is also possible to store a one-year, three-year, or other time-based update history without regard to the number of updates.

Figure 6:
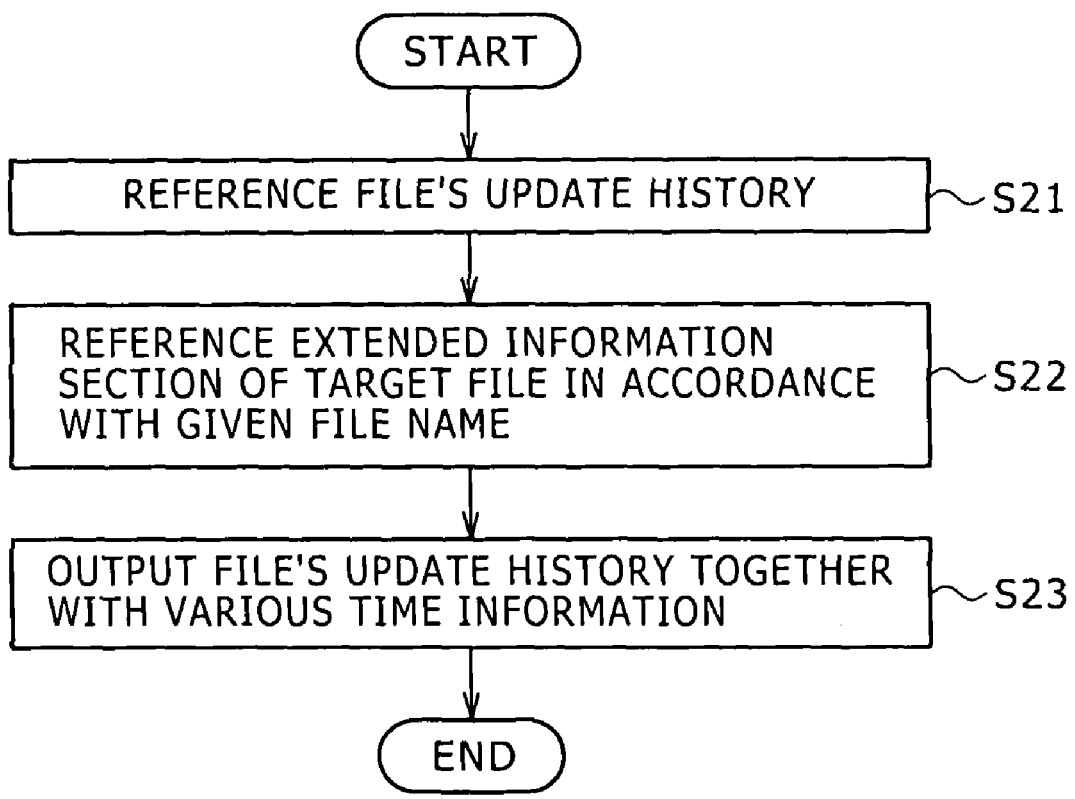
FIG. 6 is a flowchart illustrating a process for displaying a file's update history.

FIG. 6 is a flowchart illustrating a process for displaying a file's update history.

As indicated in FIG. 6, the file system 23 first references the update history of a file (step S21). More specifically, the file system 23 starts a process for referencing a file's update history in compliance with a request from an application 21.

Next, the file system 23 references the extended management information section 28 of a target file in accordance with a given file name (step S22). More specifically, the file system 23 references the extended management information section 28 of a file 25 that matches the request from the application 21. The extended management information section 28 can be recognized and referenced only by the file system 23.

Next, the file system 23 outputs the file's update history and various time information (step S23). More specifically, the file system 23 causes a display section (not shown) to display the update history of the file targeted for referencing together with various time information.

When the user wants to reference the update history of a file, the user can cause the application 21 to make a request for performing a process for referencing the file's update history, and reference the update history that is displayed on the display section via the file system 23.

When the aforementioned update history of the file is to be referenced, the file system 23 can reference the extended management information section 28 of the target file in accordance with a given file name and display the update history and retained various items of information (time information, file size, etc.), as indicated by the flowchart in FIG. 6.

Figure 7:
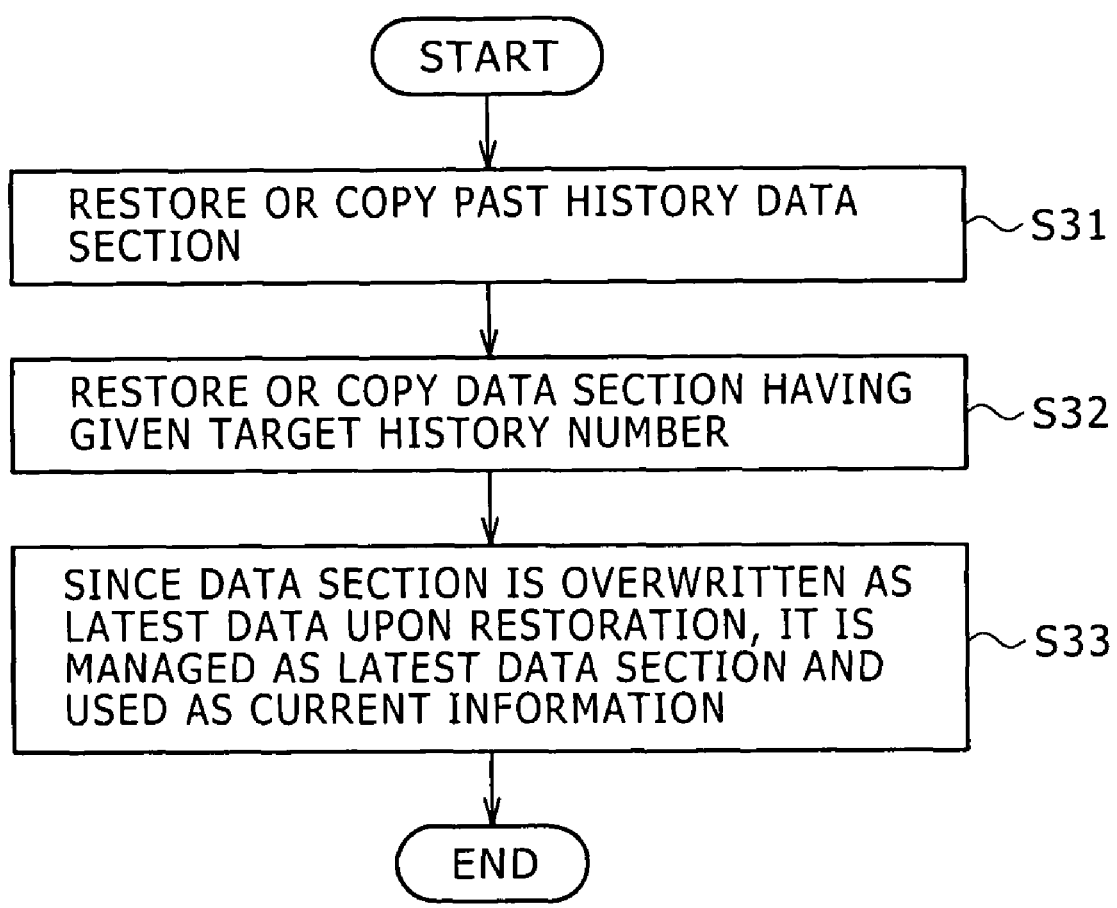
FIG. 7 is a flowchart illustrating a process for restoring or copying a past history file.

FIG. 7 is a flowchart illustrating a process for restoring or copying a past history file.

As indicated in FIG. 7, the file system 23 first starts to perform a process for restoring or copying the data section of a past history (step S31). More specifically, the file system 23 references the extended management information section 28 of a file targeted for a restore or copy process in accordance with a given file name.

Next, the file system 23 restores or copies the data having a given target history number (step S32). More specifically, the file system 23 restores or copies, for instance, data section (1) 51-1 of history information (1) 53-1, data section (2) 51-2 of history information (2) 53-2, . . . and data section (n) 51-$n$ of history information (n) 53-$n$, which are shown in FIG. 5, as the data sections having the given target history number.

When the data is restored, the data section is overwritten as the latest data. Therefore, it is managed as the latest data section and used as the current information. More specifically, the file system 23 overwrites, for instance, data 51, which is the same as data section (n) 51-*n*, as the current latest data, and records the current management information 52 about data 51, which is the same as data section (n) 51-*n*, in the management information section 27.

The process performed to restore or copy specific history data from the aforementioned file update history is as indicated in the flowchart in FIG. 7. In order to restore or copy the data section 26 of a specific past history, the history number or the like of the extended management information section 28 corresponding to the data section is specified. When the data section 26 of a target history is overwritten as a given new file in the case of a copy process or as the latest data section 26 of the same file in the case of a restore process, the restored data section 26 becomes the data section 26 of the latest history.

The present embodiment, which has been described above, makes it possible to store the update history of data at the file system level. The following uses are then made possible without developing an upper-level application.

For example, in a server for recording data for a CAD (Computer Aided Design) field or the like, a history of update data is automatically stored without intentionally acquiring a backup or the like. Further, past data can easily be restored/copied.

Further, when file updates are automatically stored in a situation where it is necessary to avoid data falsification, it is possible to construct a file system that cannot be falsified.

Furthermore, when past history data is stored on a separate disk or other separate recording medium, it is possible to construct a system that can be operated without acquiring as needed a complicated backup or a backup of whole data.

The present embodiment, which has been described above, makes it possible to update a file without allowing its information to be overwritten, refrain from exercising management with an application that may permit a file update history to be falsified, manage a file update history and data history at the file system level that does not permit falsification, and let the user read a past history file as needed via a file system.

While a preferred embodiment of the present invention has been described using specific terms, such description is for illustrative purpose only, and it is to be understood that changes and variations may be made without departing from the spirit or scope of the following claims.

What is claimed is:

1. A file information processing method for managing, in compliance with a file access request from an application, a file that is to be recorded in a recording device by a file system organized within an operating system, the file information processing method comprising:

a first step of, when a predetermined period of time elapses after a new file is created, creating a first copy data of data in the file and management information about the file, and recording history information about the first copy data as an extended attribute of the file;

a second step of creating a second copy data of the data in the new file and management information about the new file, and recording history information about the second copy data as an extended attribute of the new file;

a third step of, when the file is to be overwritten, updating the data in the new file and the history information of the new file and leaving the history information of the file;

a fourth step of referencing the updated history information through the extended attribute of the file and the extended attribute of the new file; and a fifth step that when the data is restored, handles the restored data as the latest file data, wherein an extended attribute of a predetermined file further includes physical information and management information of a copied file of the predetermined file, and wherein when the data section is updated more than one time, the file system keeps every copy of the data section associated with each update and keeps physical information and management information associated with every copy of the data section.

* * * * *